J. CHRISTIE.
Manufacture of Bridge Link-Bars.
No. 146,165.          Patented Jan. 6, 1874.
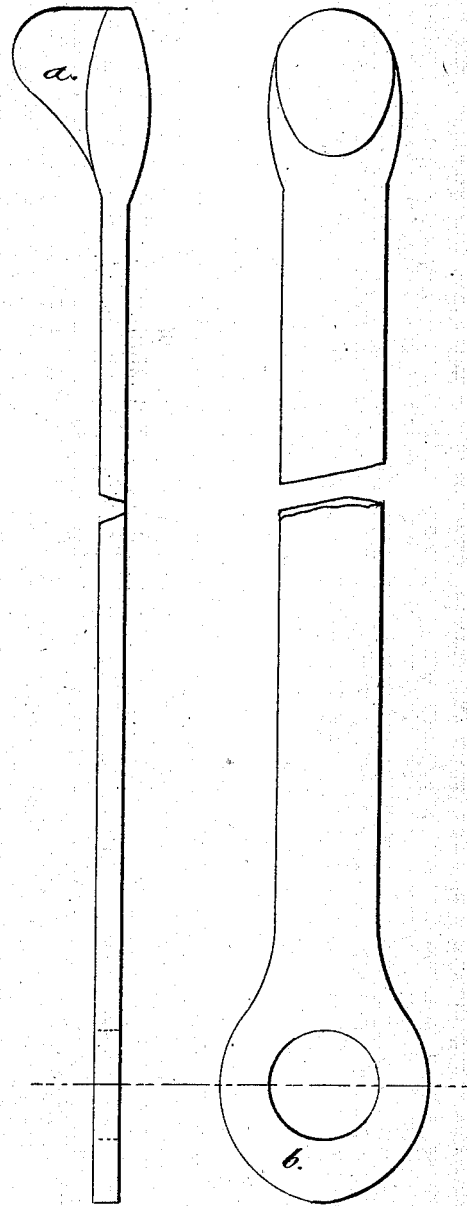

UNITED STATES PATENT OFFICE.

JAMES CHRISTIE, OF PHILLIPSBURG, NEW JERSEY.

IMPROVEMENT IN THE MANUFACTURE OF BRIDGE LINK-BARS.

Specification forming part of Letters Patent No. 146,165, dated January 6, 1874; application filed June 25, 1873.

*To all whom it may concern:*

Be it known that I, JAMES CHRISTIE, of Phillipsburg, in the county of Warren and State of New Jersey, have invented new and useful Improvements in the Art of Manufacturing Wrought-Iron Link-Bars for Iron Bridges and similar structures; and I do hereby declare that the following specification, taken in connection with the drawing furnished, is a full, clear, and exact description thereof, which will enable others skilled in the art to make and use the same.

The nature and object of my invention will be set forth in the following: Its nature consists principally in the manner of enlarging "link-bars," whereby the quality of iron is very materially toughened and refined over and above the processes at present in vogue. These processes consist either in forming the eye or the head of the bar by directly upsetting or crowding into shape in dies, or in welding in various ways, the eye or head being separately finished from the bar. The former by its very nature impairs the quality of the product, producing a crystalline fracture when broken, the iron from which it was made having been one showing good fiber.

Experiments show that to compensate for this deterioration the amount of material in the heads or eyes must be increased to at least fifty per cent. in area over that in the body of the bar. To upset such links, very powerful and expensive machinery is required in addition to what is necessary in my process. All processes in which welds are employed to join a separately-formed head to a given bar involve the uncertainty due to welding, and are therefore objectionable.

Another process has been tried and abandoned, and that is to forge down a scrap pile sufficient in quantity to form the head or eye upon the end of the bar, after bringing the two to a welding heat together in a furnace. It was found that, during the process of forging, the iron "scaled" under the working down, so that it became impossible to preserve the proper thickness of the bar at the neck, or where the eye or head joined the body of the bar. To overcome this difficulty is the object of my invention.

To enable others skilled in the art to understand and use my process, I will describe it in detail.

A bar of iron equal to the extreme length of link required is thickened by upsetting sufficiently far back from its end for the purpose of providing against the waste or loss that would occur in the heating and forging of the bar, and providing an excess of metal in the neck of the link below where the head is formed. Upon this enlargement a mass or pile of iron, as seen at *a* in the drawing, sufficient in quantity for the intended purpose, is placed, and then heated together with the bar sufficiently for welding and incorporating the whole together under the action of a hammer or press, where it is flattened and spread, as at *b* in the drawing, sufficiently for its final formation or shaping by means of dies or otherwise.

By the above-described process, scrap-iron may be advantageously and economically used, as it adds very materially to the tenacity of the link so formed. Thus a better link-head is formed than is possible to be obtained by other means.

I would further remark that link-bars thus formed are found by actual test to be nearly, if not quite, as serviceable and secure as those formed wholly of wrought or forged iron—an article whose cost of production makes it nearly, if not entirely, unmerchantable for such purposes, although none the less desirable for its reliability and great strength.

Having thus set forth my invention, I do not claim, broadly, the thickening or the enlarging of the ends of link-bars, irrespective of the herein-described process; but

What I claim as new, and desire to secure by Letters Patent of the United States, is—

The improved mode herein described of manufacturing tension-links or bars for bridges, &c.—that is to say, upsetting the bar to produce increased breadth and thickness to the head and neck forming portions, welding a mass of iron onto the flat surface of said head portion, and then reducing the same to the required thickness, and otherwise finishing said head and neck in the usual manner.

JAMES CHRISTIE. [L. S.]

Witnesses:
A. K. METZ,
W. SMITH.